July 4, 1944.  I. A. RICE  2,353,079
TOOL HOLDER
Filed Dec. 14, 1942   2 Sheets-Sheet 1
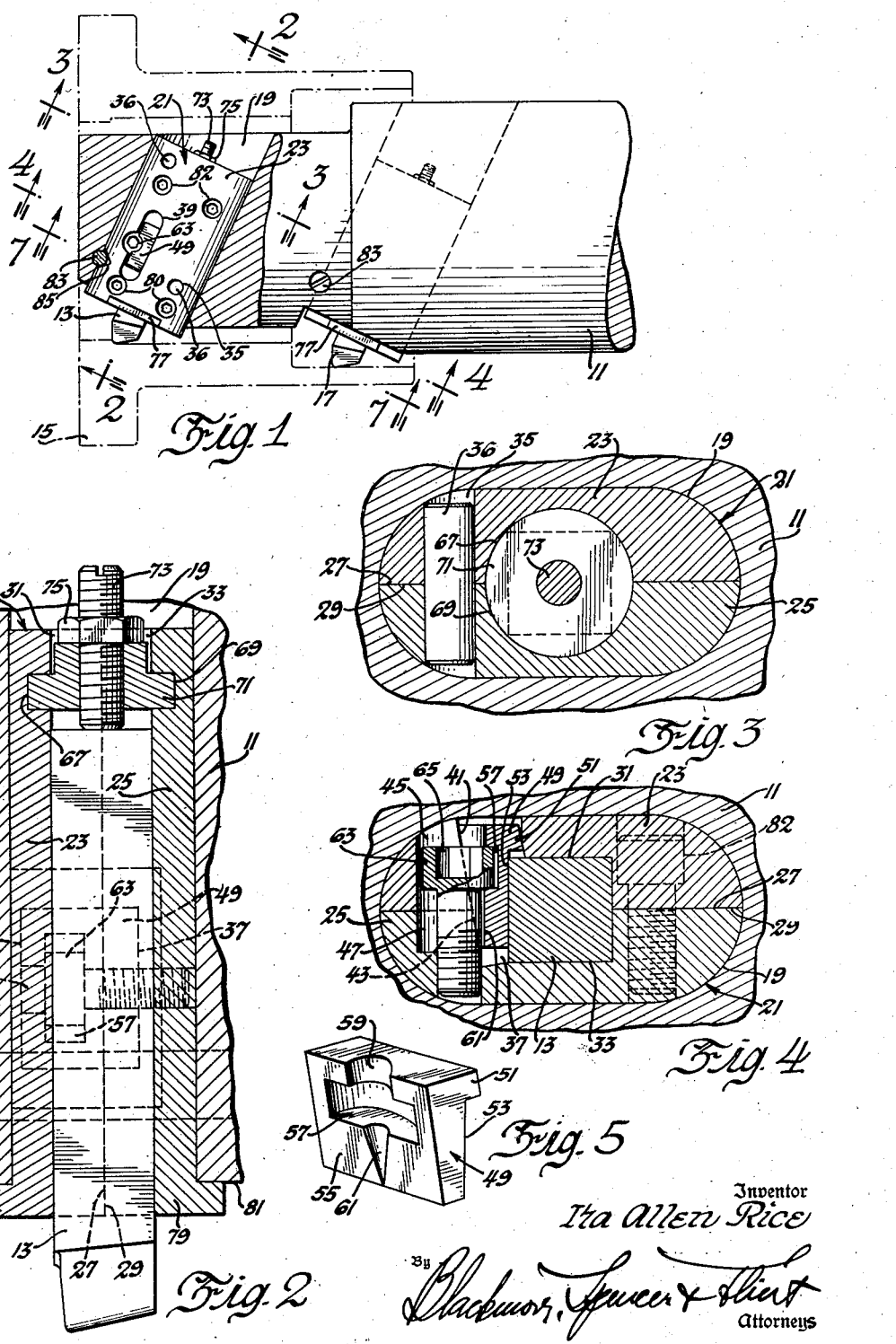
Inventor
Ira Allen Rice July 4, 1944.  I. A. RICE  2,353,079
TOOL HOLDER
Filed Dec. 14, 1942  2 Sheets-Sheet 2

Inventor
Ira Allen Rice
By Blackmore, Spencer & Flint
Attorneys

Patented July 4, 1944

2,353,079

UNITED STATES PATENT OFFICE 2,353,079

TOOLHOLDER

Ira Allen Rice, Detroit, Mich., assignor to General Motors Corporation, Detroit, Mich., a corporation of Delaware Application December 14, 1942, Serial No. 469,021

3 Claims. (Cl. 77—58)

This invention relates to cutting tools and has been designed to effect an improvement in the support for a cutting tool within a tool body or bar.

The invention has for its object a convenient arrangement for supporting a conventional cutting or boring tool within a tool carrier which latter is assembled within an appropriately formed opening in the tool body. More specifically an object is to make the carrier in the form of two mating parts having recesses within their adjacent faces to receive the tool. Other objects and advantages will be understood from the description which follows.

The accompanying drawings show an embodiment of the invention. In the drawings

Figure 1 is a plan view partly broken away and in section of a cutting tool within a carrier assembled within a tool body.

Figure 2 is a section on line 2—2 of Figure 1.

Figure 3 is a section on line 3—3 of Figure 1.

Figure 4 is a section on line 4—4 of Figure 1.

Figure 5 is a perspective of a part used in assembling the tool.

Figure 6:
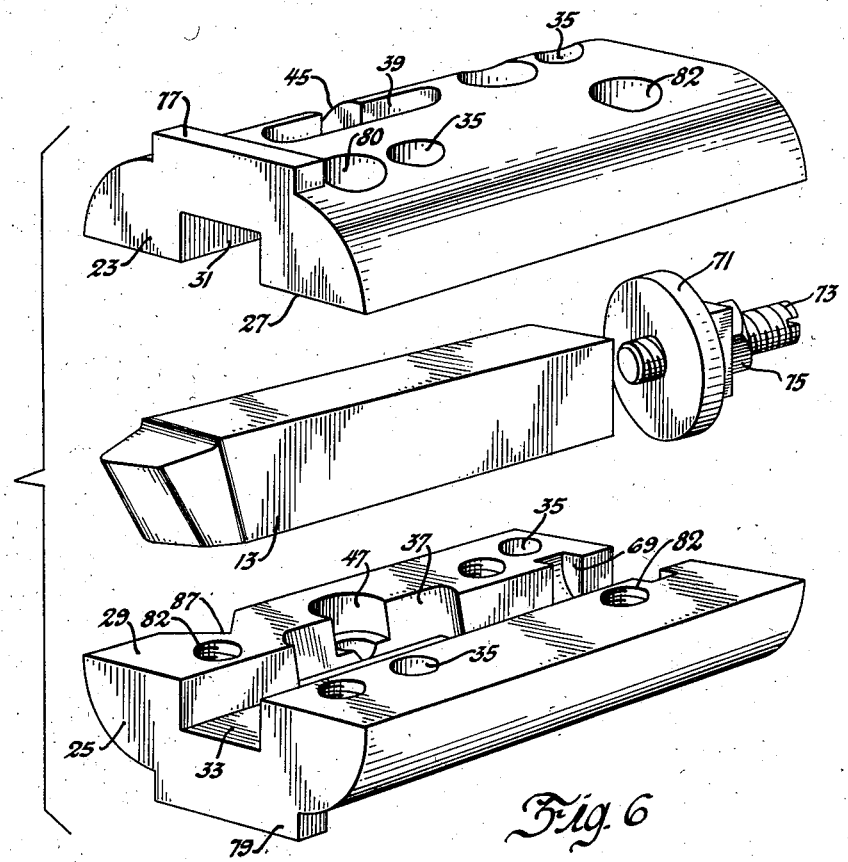
Figure 6 is a view in perspective of the carrier and tool, the parts being shown in separated relation.

To more particularly describe the device with reference to the drawings, numeral 11 has been applied to the tool body or bar. It will be obvious that this bar is to be rotated and reciprocated (by appropriate mechanism) so that a cutting tool 13 held in rigid relation thereto may bore a hole in the work marked 15. The drawings show a second cutting tool 17 similarly carried by the body 11 for the purpose of making a counterbore in the work. Since the details of the support of tool 17 differ in no essential way from the supporting means for tool 13 only the latter needs description.

The body is transversely apertured as at 19, the aperture extending at an acute angle as is customary. The dimensions of the aperture 19 are such as to receive snugly therein a tool carrier designated as a whole by numeral 21. One advantage in using a tool carrier instead of mounting the tool directly in the bar 11 is to facilitate replacement in the event of wear caused by the reaction between the tool and its support due to the operation of the tool upon the work. A new carrier can easily be replaced. A new body or bar is not required.

Figure 7:
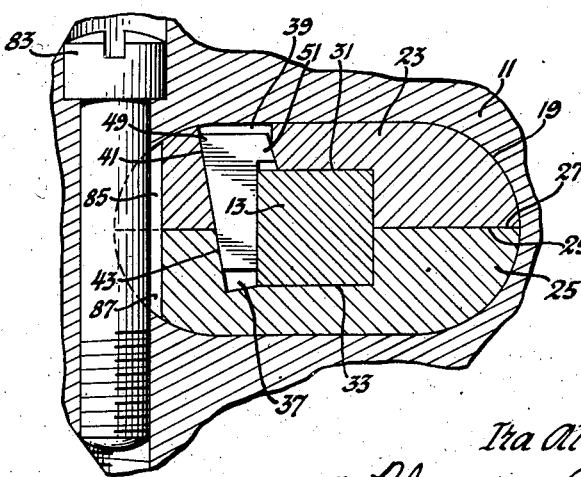
Figure 7 is a section on line 7—7 of Figure 1.

The carrier is made from two parts marked 23 and 25. The parts have faces 27 and 29 which are to be brought into contact after the assembly of the tool. The adjacent faces of the parts 23 and 25 are provided with recesses 31, 33 extending longitudinally therethrough. The shape and dimensions of the recesses are such that they receive the tool 13 therein when the parts are brought together as shown in Figure 7. Openings 35 in the two parts are for dowel pins 36 to assure correct alinement. There is also seen in part 25 a side wall recess 37. This recess opens into the long recess 33. Similarly part 23 has a recess 39, the recess 39 extending through part 23 and is open to the upper surface as shown by Figure 6 and Figure 7. It will be seen perhaps best from Figure 7 that the adjoining walls of the recesses 37 and 39 in the region remote from their opening to recesses 31 and 33 form a sloping surface 41 and 43. Also the dotted line in Figure 4 shows this sloping wall. Midway between the ends of recesses 37 and 39 there extend transversely toward the walls of the parts 23 and 25 other openings 45 and 47 of substantially circular outline.

A locking wedge 49 (Fig. 5) is received within the sloping faced recesses as above described. It has a flange 51 to overlie the upper surface of the tool as shown by Figure 4 and Figure 7. It has a face 53 to engage the tool. Its opposite angular face 55 slidably engages the sloping surface 41—43. Surface 55 is formed with recess 57 of circular outline. Extending to the top of the wedge from recess 57 is an opening 59. Downwardly from recess 57 is a tapered recess 61. The rounded head of a threaded bolt 63 is placed within recess 57 of the wedge. When the parts are assembled the head projects into recess 45. The threaded part of the bolt extends through the recess 47 of part 25 into which part it is threaded in the region below recess 47 as shown by Figure 4, the bolt being received also in notch 61. The head 63 has an angular opening 65 to receive a suitable tool. When the bolt is threaded into part 25, its head 63 being within recess 57, it carries the wedge downwardly and locks the tool to the carrier, shoulder 51 limiting the movement.

To adjust the tool axially the wedge lock is first loosened. Cooperating semicircular recesses 67 and 69 in the tool carrier parts house a nut 71. Through the nut is threaded a screw 73 to engage the end of the tool. A lock nut is marked 75. The parts of the carrier are secured together by screws 80 in openings 82.

The carrier parts may be provided with flanges 77 and 79 to engage flat faces 81 provided on the bar whereby the reaction forces from the application of the tool to the work are transmitted to the bar when the assembled tool and carrier is secured in the bar opening. When so assembled it is held by conventional means such as a set screw 83 threaded into the bar and passing through notches 85, 87 in the carrier parts 23 and 25.

I claim:

1. In a bar, carrier and tool assembly, a carrier for a tool, said carrier comprising two mating parts, said parts having recesses, said recesses shaped to jointly fit the cross section of a tool shank, means to fasten said parts together, means to adjust the tool along its axis in said recesses and wedge means adapted to engage said tool shank with one face and to engage both said carrier parts with its other face to grip said tool shank in adjusted position.

2. In a bar, carrier and tool assembly, a carrier for a tool, said carrier comprising two mating parts, said parts having recesses, each recess having angularly related walls, said recesses shaped to jointly fit the cross section of a tool shank, means to fasten said parts together, means to adjust the tool along its axis in said recesses and wedge means adapted to engage said tool shank with one face and to engage both said carrier parts with its other face to grip said tool shank in adjusted position.

3. In a bar, carrier and tool assembly, a carrier for a tool, said carrier comprising two mating parts, said parts having recesses, said recesses shaped to jointly fit the cross section of a tool shank, means to fasten said parts together, means to adjust the tool along its axis in said recesses and wedge means to grip said tool shank in adjusted position, said wedge means adapted to be assembled through a slot in one of said parts and to engage said tool shank and both said parts and threaded means to project said wedge into tool locking position.

IRA ALLEN RICE.